(12) United States Patent
Liao et al.

(10) Patent No.: US 11,493,196 B1
(45) Date of Patent: Nov. 8, 2022

(54) ASSEMBLY STRUCTURE

(71) Applicant: TAIWAN OASIS TECHNOLOGY CO., LTD., New Taipei (TW)

(72) Inventors: Shih-Meng Liao, New Taipei (TW); Che-Wei Yeh, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 94 days.

(21) Appl. No.: 17/241,187

(22) Filed: Apr. 27, 2021

(51) Int. Cl.
  *F21V 23/06* (2006.01)
  *F21V 21/008* (2006.01)
  *F16L 37/26* (2006.01)

(52) U.S. Cl.
  CPC .............. *F21V 23/06* (2013.01); *F16L 37/26* (2013.01); *F21V 21/008* (2013.01)

(58) Field of Classification Search
  CPC ......... F21V 23/06; F21V 21/008; F16L 37/26
  See application file for complete search history.

(56) References Cited

FOREIGN PATENT DOCUMENTS

| CN | 103775914 A | * | 5/2014 | ............ F21S 2/00 |
|---|---|---|---|---|
| CN | 207421864 U | | 5/2018 | |
| CN | 210345360 U | | 4/2020 | |
| CN | 211083835 U | | 7/2020 | |
| TW | M574204 U | | 2/2019 | |
| TW | M619886 U | | 11/2021 | |
| WO | 2021057941 A1 | | 4/2021 | |

OTHER PUBLICATIONS

1st office action for corresponding TW Application No. 110118431, dated Feb. 10, 2022.

* cited by examiner

*Primary Examiner* — Mary Ellen Bowman
(74) *Attorney, Agent, or Firm* — Demian K. Jackson; Jackson IPG PLLC

(57) ABSTRACT

An assembly structure includes an outer joint assembly and an inner joint assembly. At least one terminal portion of the outer joint assembly is hollow to form an accommodating space, the outer joint assembly includes an outer casing and at least one elastic sheet, the elastic sheet has a fixed end and a free end, the fixed end is connected to the outer casing, and the free end is provided with a first engaging part. The outer surface of the inner joint assembly is provided with a second engaging part, the inner joint assembly is used to extend into the accommodating space, and the first engaging part and the second engaging part are used to engage with each other. Through the above design, the assembly structure has quick connect capability, which makes it more convenient for users to use.

21 Claims, 9 Drawing Sheets

ASSEMBLY STRUCTURE

BACKGROUND

1. Technical Field

The present disclosure relates to an assembly structure with quick connect capability, and in an implementation manner, through this assembly structure, electric devices can be installed in the assembly structure and can be rotated by the user steplessly and cyclically.

2. Related Art

China Patent Application No. CN201922245446.1 discloses a chandelier that can switch lighting modes. The lamp device is installed in an assembly structure that can be hung from the ceiling, and the lamp device can be rotated in two sections to provide horizontal lighting and vertical lighting modes. However, the assembly structure of China Patent Application No. CN01922245446.1 has no connect quickly capability, and only provides two-sections rotation of the lamp device without being rotated steplessly and allowing the user to rotate the lamp device cyclically. Therefore, the convenience of the above assembly structure is still inadequate. For example, it cannot provide lighting modes with specific oblique angles other than the horizontal lighting and vertical lighting modes.

SUMMARY

According to one objective of the present disclosure, an assembly structure with quick connect capability is provided, and the assembly structure comprises an outer joint assembly and an inner joint assembly. At least one terminal portion of the outer joint assembly is hollow to form an accommodating space, the outer joint assembly comprises an outer casing and at least one elastic sheet, the elastic sheet has a fixed end and a free end, the fixed end is connected to the outer casing, and the free end is provided with a first engaging part. An outer surface of the inner joint assembly is provided with a second engaging part, the inner joint assembly is used to extend into the accommodating space, and the first engaging part and the second engaging part are used to engage with each other.

According to the above features, the free end and the outer casing form a gap therebetween.

According to the above features, the gap gradually increases from the fixed end to a tail of the free end.

According to the above features, the elastic sheet is disposed on an inner surface of the outer casing, the fixed end is fixed to the inner surface, and the free end and the inner surface form the gap therebetween.

According to the above features, the assembly structure further comprises a circular electric socket and a circular electric plug, wherein the circular electric socket is disposed in the accommodating space of the outer joint assembly, and the circular electric plug is disposed in the inner joint assembly, or alternatively, the circular electric plug disposed in the accommodating space of the outer joint assembly, and the circular electric socket is disposed in the inner joint assembly; wherein the circular electric socket and the circular electric plug are used to electrically connected to each other.

According to the above features, the assembly structure further comprises a circular electric socket and a circular electric plug. The circular electric socket is disposed on the side wall of the accommodating space of the outer joint assembly, wherein the circular electric socket is connected to an power supply device via a first electrical connection wire. The circular electric plug is disposed on the side wall of the inner joint assembly, wherein the side wall of the inner joint assembly is connected to a part of the outer surface which is close to the second engaging part, and the circular electric plug is connected to an electric device via a second electrical connection wire.

According to the above features, the at least one elastic sheet is two elastic sheets spaced apart from each other.

According to the above features, the first engaging part is a bump, and the second engaging part is a groove; or alternatively, the first engaging part is a groove, and the second engaging part is a bump.

According to the above features, the first engaging part is a bump, the second engaging part is a 360-degree annular groove, and an outer wall of the annular groove has a notch corresponding to the bump, wherein a width of the notch is smaller than a width of the bump.

According to the above features, the bump has a curved surface.

According to the above features, the bump has a first inclined surface and a second inclined surface connected to the first inclined surface, a slope of the second inclined surface is smaller than a slope of the first inclined surface, the annular groove is composed of a first concave surface and a second concave surface connected to the first concave surface, the first concave surface and the first inclined surface are mutually engaged, and the second concave surface and the second concave surface are mutually engaged.

According to one objective of the present disclosure, an assembly structure with quick connect capability is provided, and the assembly structure comprises an outer joint assembly and an inner joint assembly. At least one terminal portion of the outer joint assembly is hollow to form an accommodating space, and the outer joint assembly comprises an outer casing, and the outer casing is provided with a first engaging part. The inner joint assembly is provided with at least one elastic sheet, the elastic sheet has a fixed end and a free end, the fixed end is fixed to the inner joint assembly, the free end is provided with a second engaging part, the inner joint assembly is used to extend into the accommodating space, and the first engaging part and the second engaging part are used to engage with each other.

According to the above features, the free end and the inner joint assembly form a gap therebetween.

According to the above features, the gap gradually increases from the fixed end to a tail of the free end.

According to the above features, the first engaging part is disposed on an inner surface of the outer casing, the elastic sheet is disposed on an outer surface of the inner joint assembly, the fixed end is fixed to the outer surface, and the free end and the outer surface form the gap.

According to the above features, the assembly structure further comprises a circular electric socket and a circular electric plug, wherein the circular electric socket is disposed in the accommodating space of the outer joint assembly, and the circular electric plug is disposed in the inner joint assembly, or alternatively, the circular electric plug is disposed in the accommodating space of the outer joint assembly, and the circular electric socket is disposed in the inner joint assembly; wherein the circular electric socket and the circular electric plug are used to electrically connected to each other.

According to the above features, the assembly structure further comprises a circular electric socket and a circular electric plug. The circular electric socket is disposed in the outer joint assembly, wherein the circular electric socket is connected to an power supply device via a first electrical connection wire. The circular electric plug is disposed in the inner joint assembly, wherein the circular electric plug is connected to an electric device via a second electrical connection wire.

According to the above features, the at least one elastic sheet is two elastic sheets spaced apart from each other.

According to the above features, the first engaging part is a bump, and the second engaging part is a groove; or alternatively, the first engaging part is a groove, and the second engaging part is a bump.

According to the above features, the bump has a curved surface.

According to the above features, the bump has a first inclined surface and a second inclined surface connected to the first inclined surface, a slope of the second inclined surface is smaller than a slope of the first inclined surface, the groove is an annular groove and is composed of a first concave surface and a second concave surface connected to the first concave surface, the first concave surface and the first inclined surface are mutually engaged, and the second concave surface and the second concave surface are mutually engaged.

To sum up, compared with the prior art, the assembly structure of the embodiment of the present disclosure has quick connect capability, so it is very convenient and quick for the user to assemble the outer joint assembly and the inner joint assembly, and it can increase the convenience of use and reduce the difficulty of assembly.

BRIEF DESCRIPTIONS OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTIONS OF EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

In order to solve the technical problem that the assembly structure used for the chandelier does not have the quick connect capability in the past, an embodiment of the present disclosure provides an assembly structure, which has quick connect capability through a special hardware design. In addition, in some design manners, the electric device installed in the assembly structure can be rotated steplessly and/or cyclically, so as to provide users with good experience and better convenience. Furthermore, in the assembly structure of the embodiment of the present disclosure, one of the outer joint assembly and the inner joint assembly is provided with an elastic sheet, and the other one is provided with a corresponding engaging part, so that the elastic sheet will be deformed during quick connect, and then this will make the outer joint assembly and the inner joint assembly engaged to each other, so as to achieve the purpose of quick connect.

Figure 1:
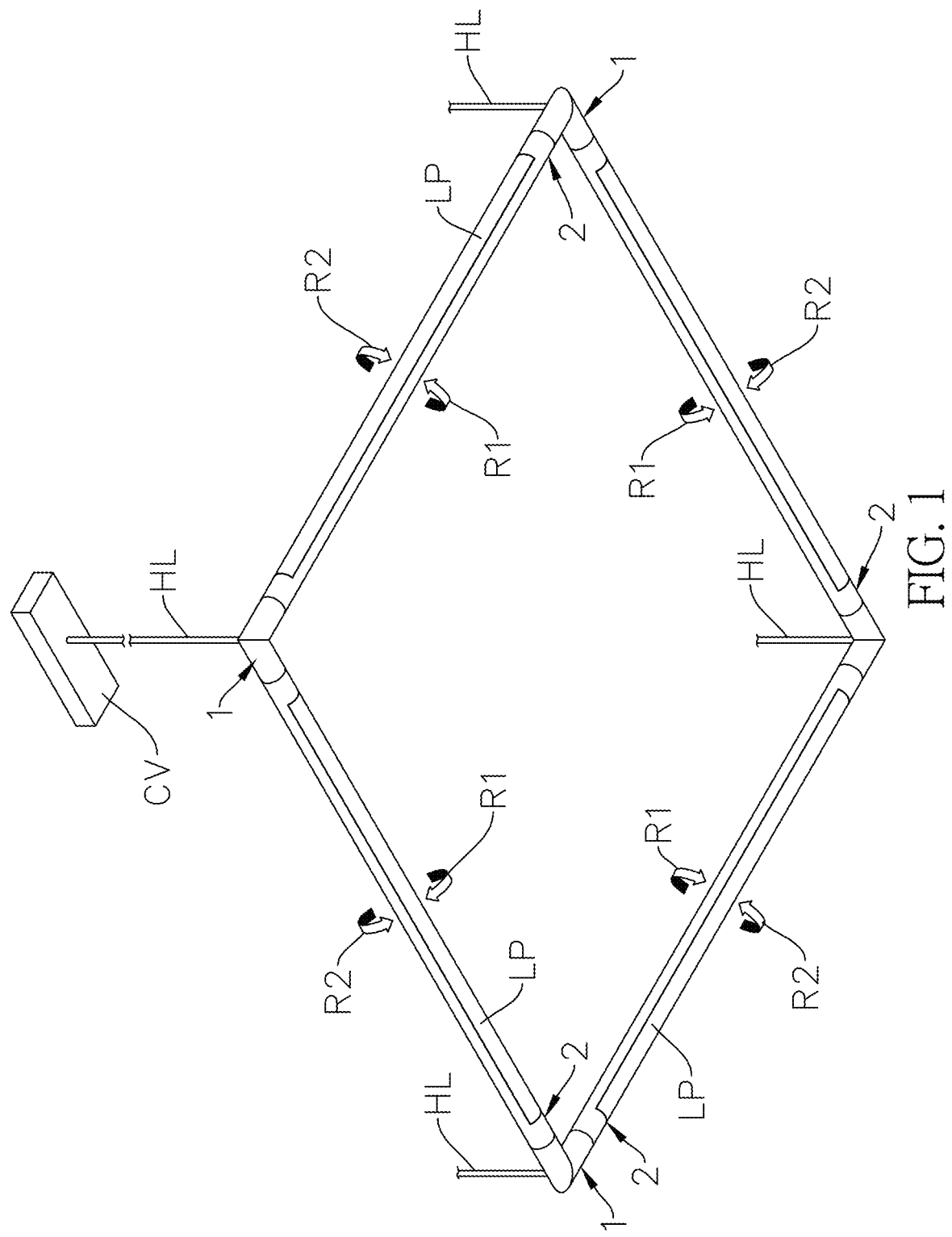
FIG. 1 is a three dimensional diagram of an electric apparatus using an assembly structure according to a first embodiment of the present disclosure.

Refer to FIG. 1, and FIG. 1 is a three dimensional diagram of an electric apparatus using an assembly structure according to a first embodiment of the present disclosure. The electrical device has multiple outer joint assemblies 1 and multiple inner joint assemblies 2, each of the multiple outer joint assemblies 1 is L-shaped and connected with hanging wire HL. Each of the multiple outer joint assemblies 1 can be engaged with two strip-shaped inner joint assemblies 2, and in this embodiment, the strip-shaped inner joint assembly 2 is engaged by the two outer joint assemblies 1. The connection of outer joint assembly 1 and inner joint assembly 2 is performed by quick connect capability, and its implementations and details are described later.

In addition, an electric device LP (for example, a lighting device) can be installed in the inner joint assembly 2. The outer joint assembly 1 and the inner joint assembly 2 have a circular electric socket and a circular electric plug, respectively. When they are engaged with each other, the circular electric socket and the circular electric plug will be contacted and electrically connected to each other. Furthermore, one of the hanging wire HL is connected to an power supply device CV, and is electrically connected to the circular electric socket through the wires concealed in the hanging wire HL and the outer joint assembly 1 to provide power to the electric device LP. In addition, in this embodiment, the assembly structure 100 formed by the outer joint assembly 1 and the inner joint assembly 2 not only has the quick connect capability, but also allows the electric device LP to be rotated along a direction R1 or R2 in a stepless manner and/or cyclical manner. When the electric device LP is a lighting device, it can provide not only horizontal lighting and vertical lighting, but also oblique lighting at a specific angle.

In FIG. 1, the electric apparatus is a chandelier device that can be hung from the ceiling as an example, but the present disclosure is not limited thereto. In addition to the lighting device, the electric device LP can also be other electric devices, such as sterilization devices, heating devices, or display devices. In short, the types of electric devices that can be used in the assembly structure 100 of the embodiment of the present disclosure are not limited. In addition, although in FIG. 1, a plurality of outer joint assemblies 1 and a plurality of inner joint assemblies 2 are taken as an example for descriptions, and that the outer joint assembly 1 is L-shaped and can be interlocked with two strip-shaped inner joint assemblies 2 is taken as an example for descriptions, the present disclosure is not limited thereto. The shapes of outer joint assembly 1 and inner joint assembly 2 and the number of them that can be engaged with the other are not limited.

Figure 2:
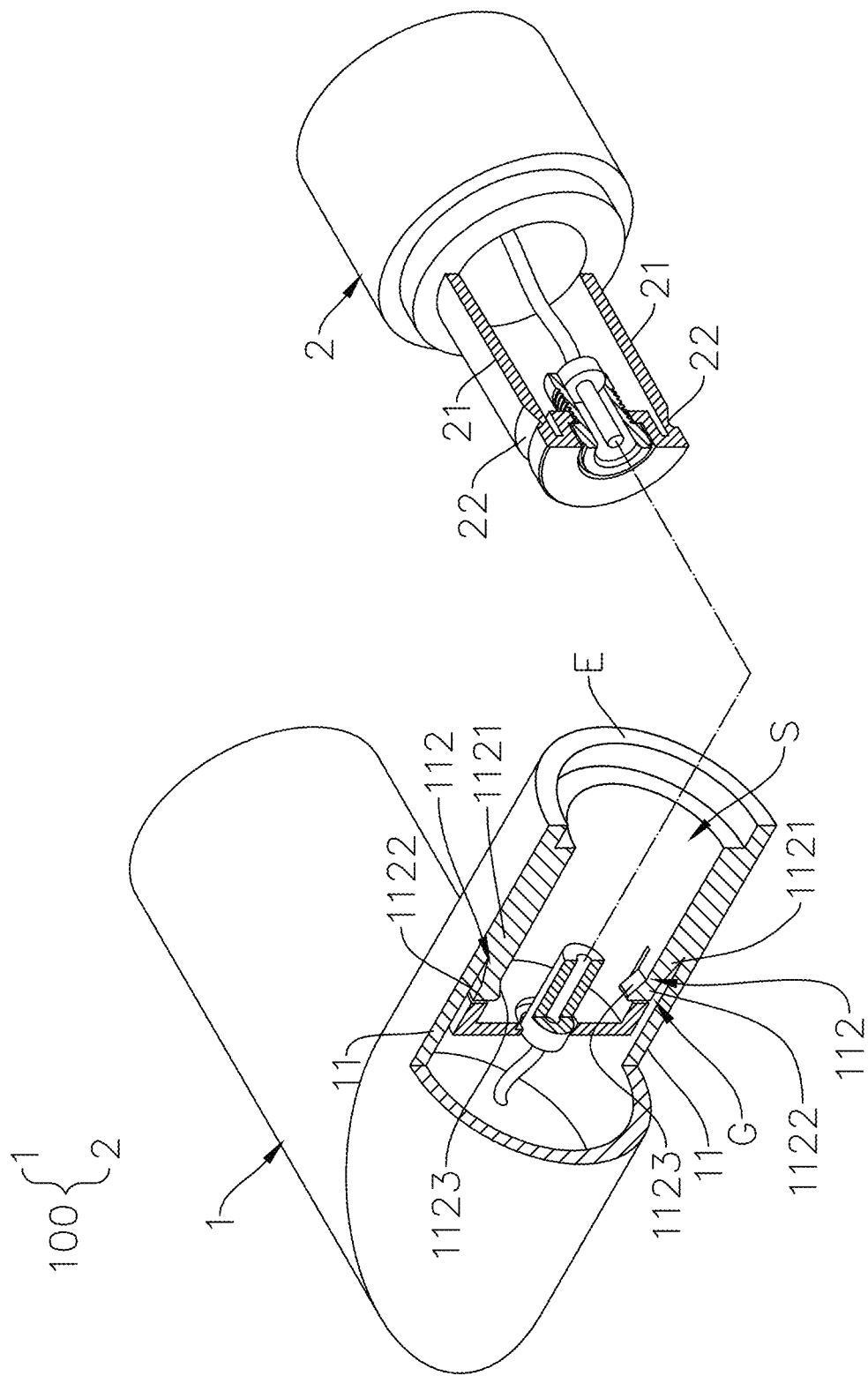
FIG. 2 is a schematic sectional diagram of a partial of the assembly structure when quickly assembling the electric apparatus of the first embodiment of the present disclosure.

Refer to FIG. 2, and FIG. 2 is a schematic sectional diagram of a partial of the assembly structure when quickly assembling the electric apparatus of the first embodiment of the present disclosure. The assembly structure 100 comprises an outer joint assembly 1 and an inner joint assembly 2. At least one terminal portion E (for example, the right terminal portion) of the outer joint assembly 1 is hollow to form an accommodating space S. The outer joint assembly 1 comprises an outer casing 11 and at least one elastic sheet 112 (for example, two elastic sheets 112 spaced apart from each other on the upper and lower parts of the outer casing 11). The elastic sheet 112 has a fixed end 1121 and a free end 1122, and the fixed end 1121 is connected to the outer casing 11. The free end 1122 and the outer casing 11 form a gap G therebetween, and the free end 1122 has a first engaging part 1123. The outer surface 21 of the inner joint assembly 2 is provided with a second engaging part 22, the inner joint assembly 2 is used to extend into the accommodating space S, and the first engaging part 1123 and the second engaging part 22 are used to engage with each other. Through the above design, the assembly structure 100 of the embodiment of the present disclosure can have the quick connect capability.

In addition, the first engaging part 1123 can be designed as a bump, and the second engaging part 22 can be designed as a 360-degree annular groove, so as to achieve the function of steplessly rotating the inner joint assembly 2 in a cyclical manner Furthermore, in other embodiments, the first engaging part 1123 is designed to be a groove and the second engaging part 22 is designed to be a 360-degree annular bump, so as to achieve the functions of quick connect and steplessly rotating of the inner joint assembly 2. In particular, the aforementioned "steplessly and cyclically rotating" means that it can rotate at any angle counterclockwise and can rotate more than 360 degrees, or can rotate at any angle clockwise and can rotate more than 360 degrees.

Figure 3:
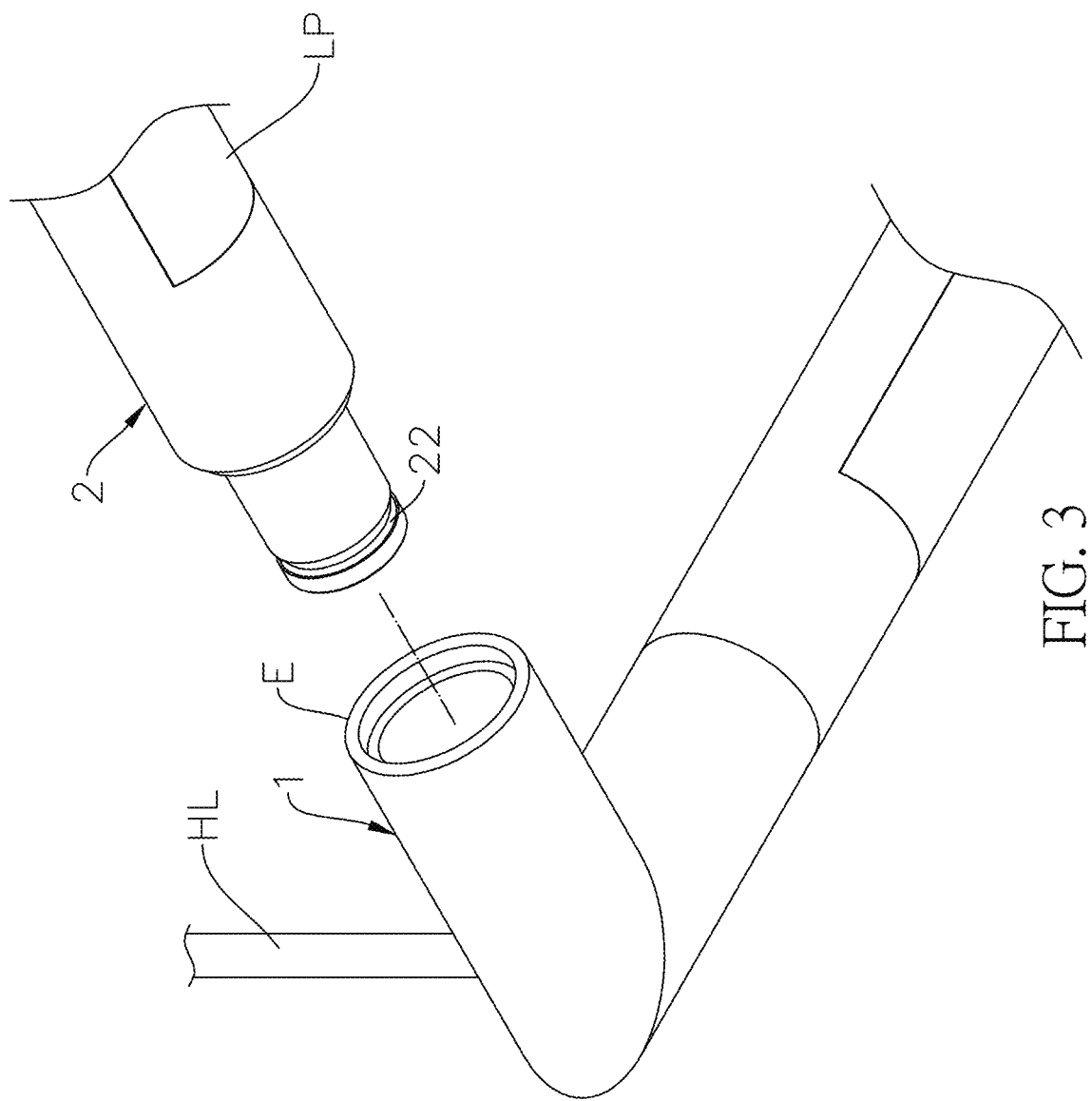
FIG. 3 is a schematic three dimensional diagram of a partial of the assembly structure when quickly assembling the electric apparatus of the first embodiment of the present disclosure.

Refer to FIG. 2 and FIG. 3, and FIG. 3 is a schematic three dimensional diagram of a partial of the assembly structure when quickly assembling the electric apparatus of the first embodiment of the present disclosure. It can be seen from FIG. 3 that the user only needs to extend the inner joint assembly 2 into the accommodating space S of the outer joint assembly 1, and the first engaging part 1123 and the second engaging part 22 can be engaged with each other to realize the quick connect capability.

Figure 4:
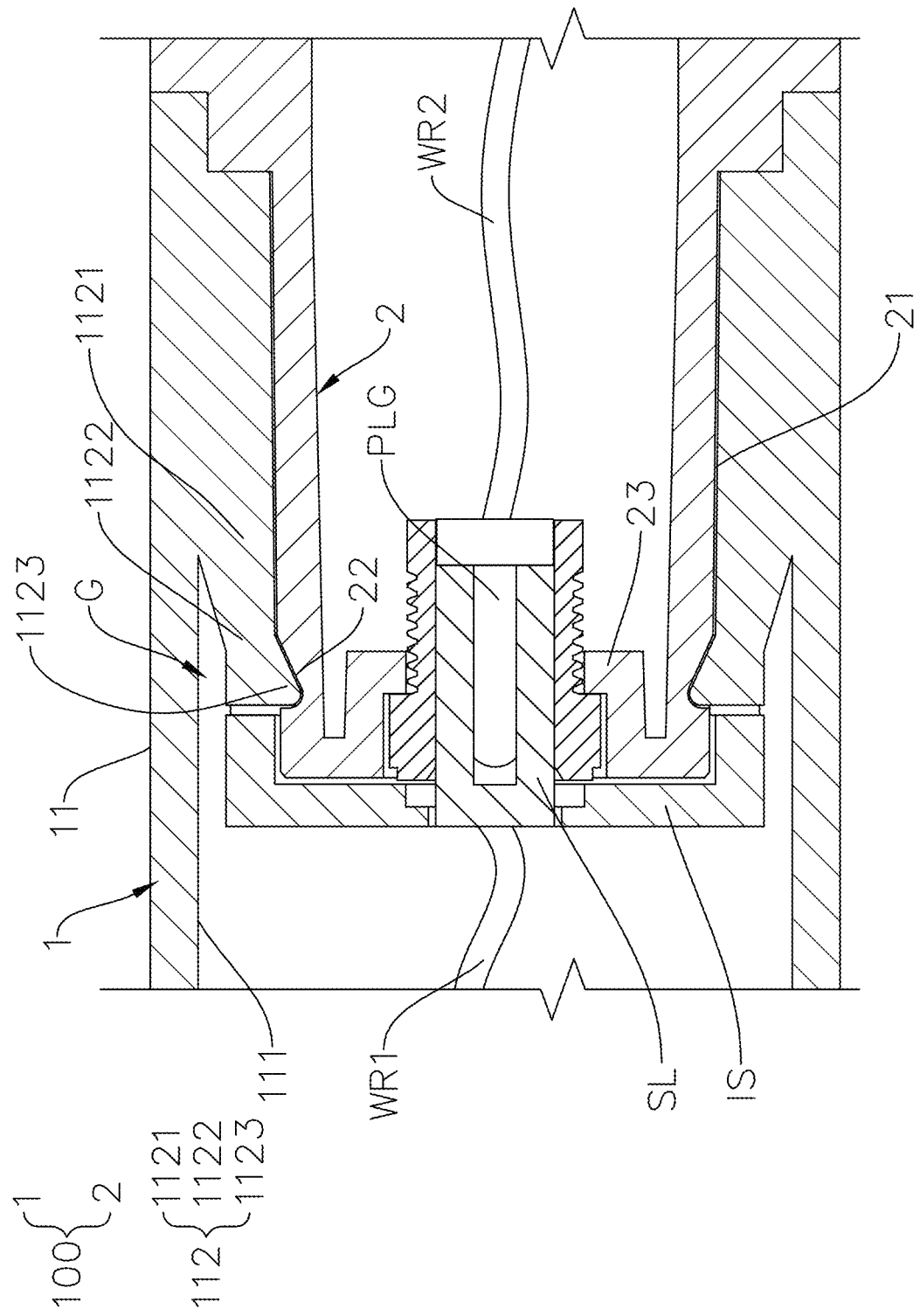
FIG. 4 is a schematic sectional diagram of a partial of the assembly structure of the electric apparatus of the first embodiment of the present disclosure.

Refer to FIG. 4, and FIG. 4 is a schematic sectional diagram of a partial of the assembly structure of the electric apparatus of the first embodiment of the present disclosure. Further, the gap G gradually increases from the fixed end 1121 to a tail of the free end 1122. The elastic sheet 112 is disposed on an inner surface 111 of the outer casing 11, the fixed end 1121 is fixed to the inner surface 111, and the free end 1122 and the inner surface 111 form the gap G. Thus, when the inner joint assembly 2 extends the accommodating space S of the outer joint assembly 1, the elastic sheet 112 has a space for deforming.

In FIG. 4, the assembly structure 100 further comprises a circular electric socket SL and a circular electric plug PLG. The circular electric socket SL is disposed on the side wall IS of the accommodating space S of the outer joint assembly 1, and the circular electric socket SL is connected to the power supply device CV via the first electrical connection wire WR1. The circular electric plug PLG is disposed on the side wall 23 of the inner joint assembly 2. The side wall 23 is connected to a part of the outer surface 21 near the second engaging part 22, and the circular electric plug PLG is connected to the electric device LP via the second electrical connection wire WR2. When the inner joint assembly 2 is engaged to the outer joint assembly 1, the circular electric socket SL and the circular electric plug PLG are electrically connected to each other, so that the electric device LP installed in the inner joint assembly 2 can be powered to work. In this embodiment, the circular electric socket SL and the circular electric plug PLG may be the specifications of the single-pin electric socket and plug of the T8 lamp tube, but the present disclosure is not limited to this. Therefore, the circular electric socket SL and the circular electric plug PLG are mutually rotated in the stepless and cyclical manner.

Figure 5:
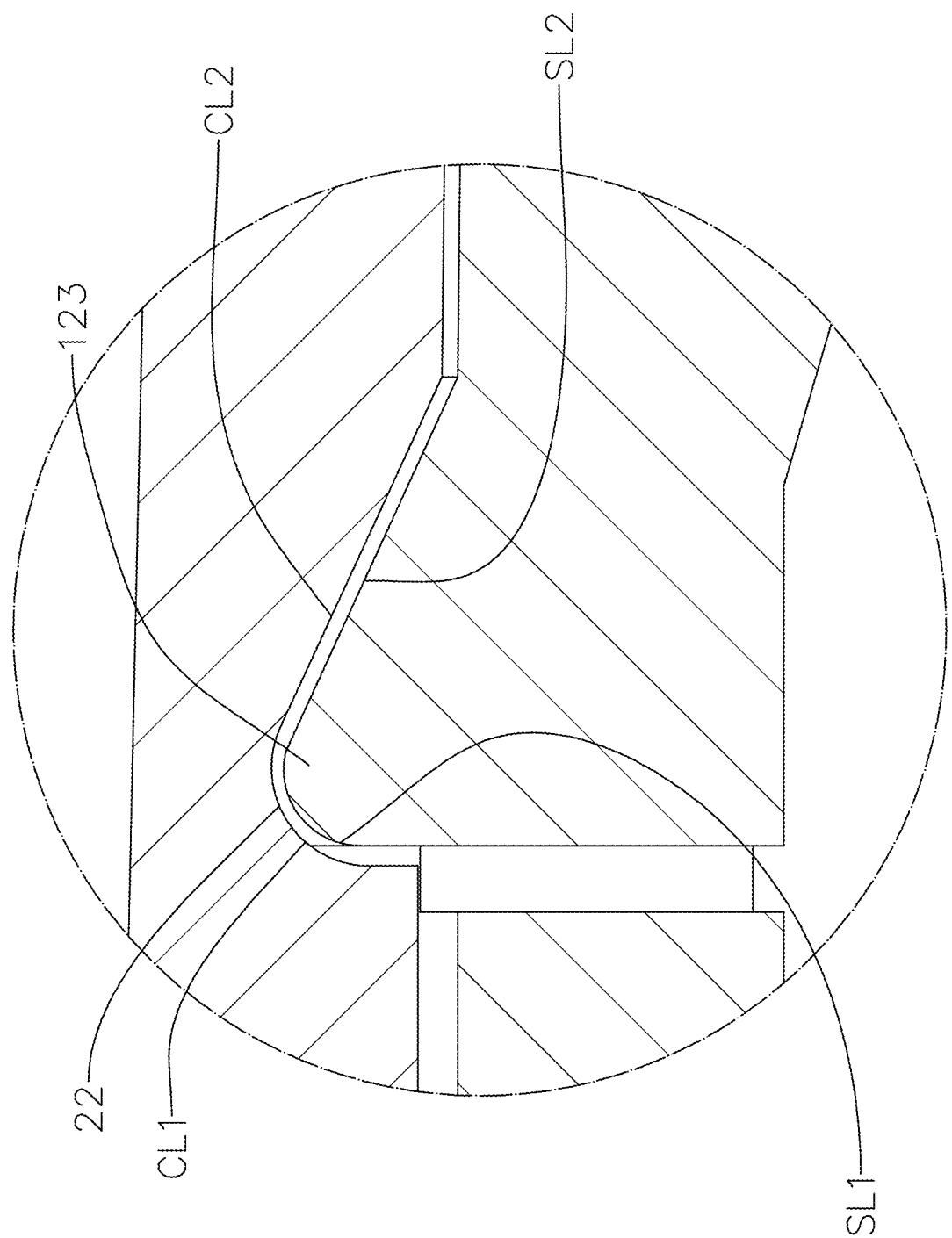
FIG. 5 is a schematic sectional diagram of another partial of the assembly structure of the electric apparatus of the first embodiment of the present disclosure.

Refer to FIG. 5, and FIG. 5 is a schematic sectional diagram of another partial of the assembly structure of the electric apparatus of the first embodiment of the present disclosure. One of the details of the realization of the bump and the annular groove is presented in FIG. 5, but this does not mean that the implementation in FIG. 5 is used to limit the present disclosure. The bump has a plurality of connected inclined surfaces, for example, the first inclined surface SL1 and the second inclined surface SL2, wherein the first inclined surface SL1 is closer to the tail of the free end 1122 of the elastic sheet 112 than the second inclined surface SL2. The slope of the second inclined surface SL2 is smaller than the slope of the first inclined surface SL1. The annular groove has a plurality of connected concave surfaces, for example, a first concave surface CL1 and a second concave surface CL2. The first concave surface CL1 and the first inclined surface SL1 can be engaged to each other, and the second concave surface CL2 and the second inclined surface SL2 can be engaged to each other. In particular, the bump may also be a bump with a curved surface.

Figure 6:
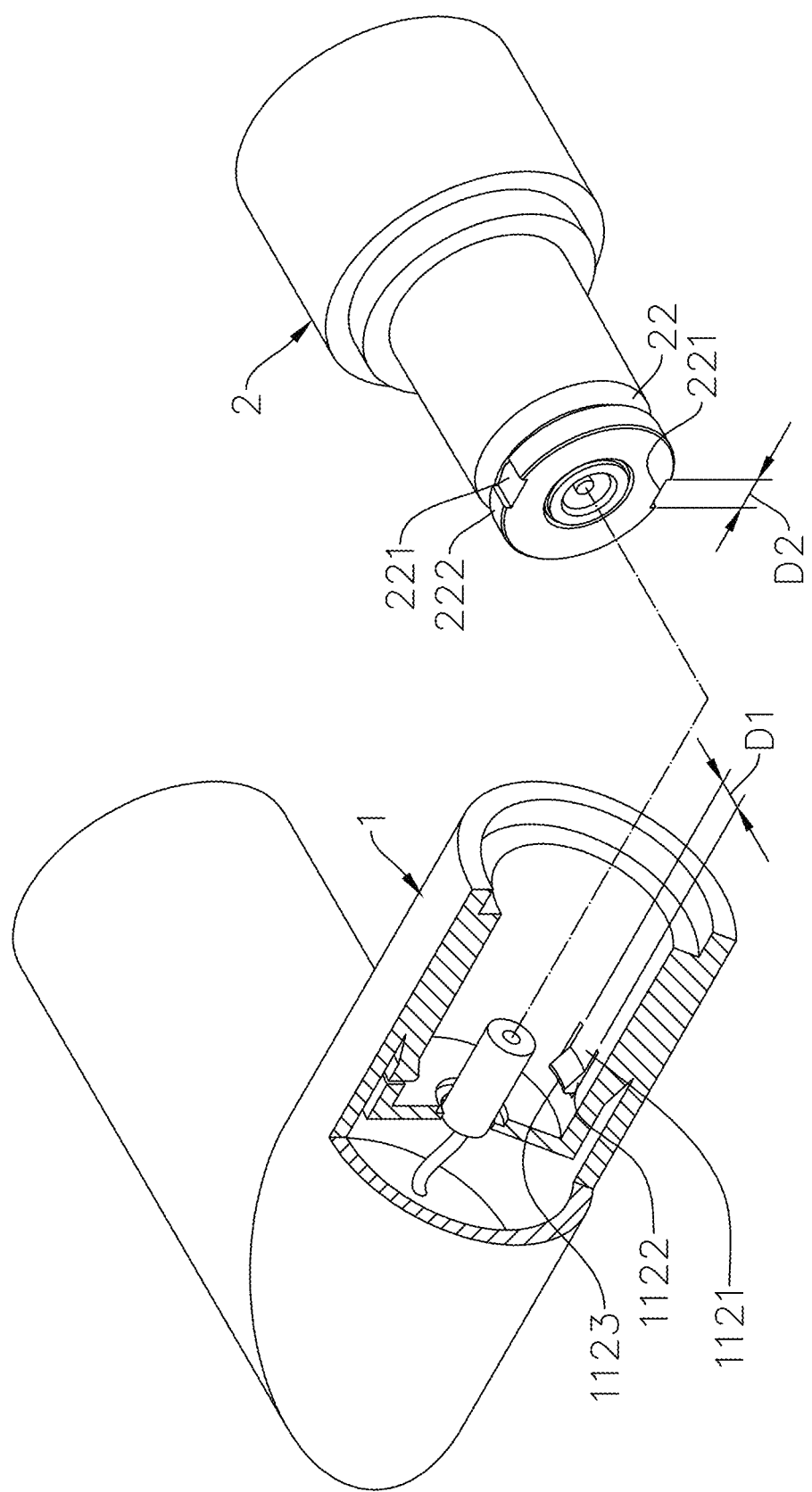
FIG. 6 is a schematic sectional diagram of a partial of an assembly structure when quickly assembling an electric apparatus of a second embodiment of the present disclosure.

FIG. 6 is a schematic sectional diagram of a partial of an assembly structure when quickly assembling an electric apparatus of a second embodiment of the present disclosure. In this embodiment, the first engaging part 1123 is a bump, and the second engaging part 22 is a 360-degree annular groove, the embodiment is different from the previous embodiment (the outer wall of the annular groove has no notch, it has a continuous annular outer wall), and the outer wall 222 of the annular groove of this embodiment has a notch 221 corresponding to the bump. The width D2 of the notch 221 is smaller than the width D1 of the bump, so as to prevent the inner joint assembly 2 and the outer joint assembly 1 from being accidentally loosened from each other.

Figure 7:
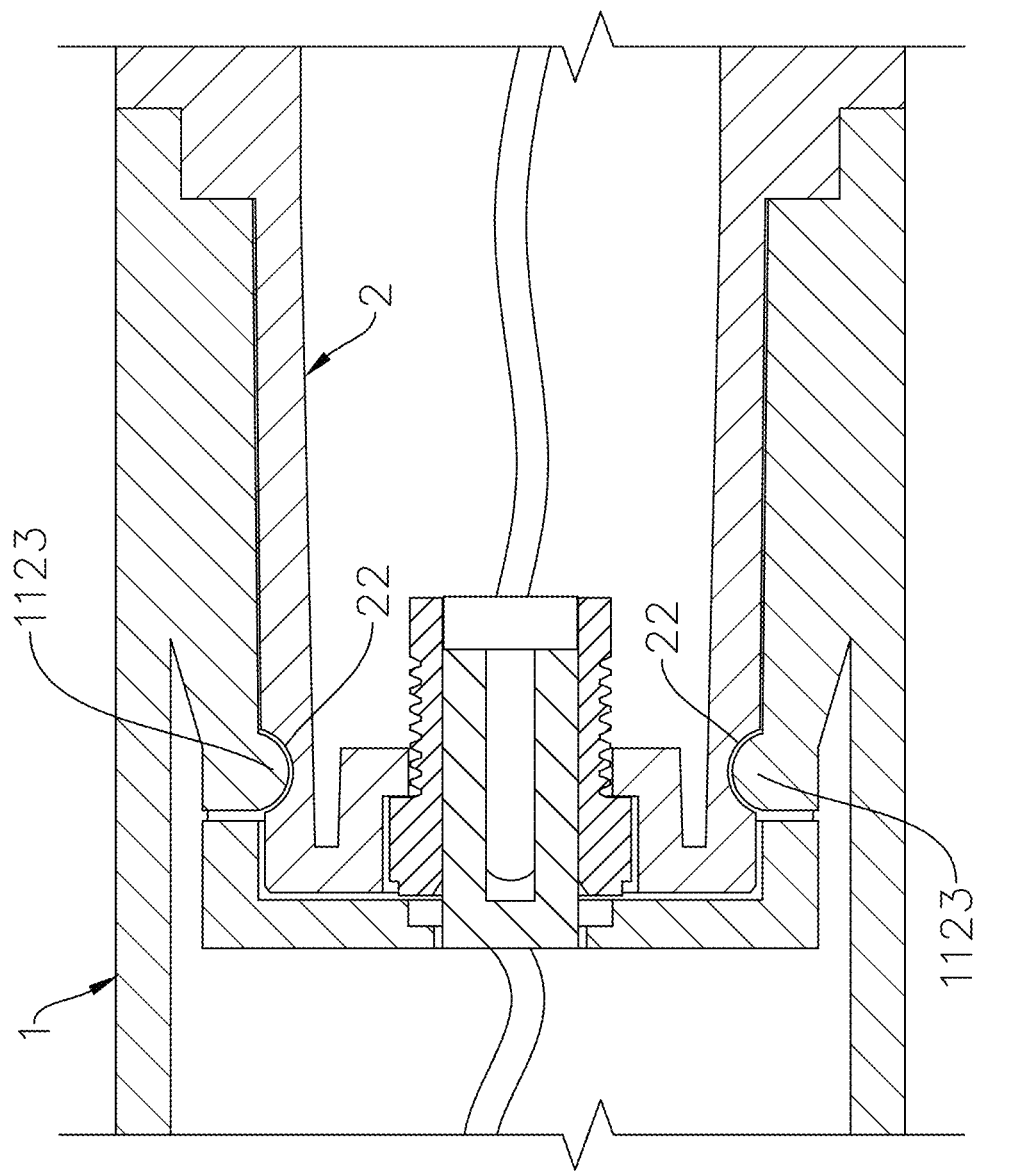
FIG. 7 is a schematic sectional diagram of a partial of an assembly structure of an electric apparatus of a third embodiment of the present disclosure.

FIG. 7 is a schematic sectional diagram of a partial of an assembly structure of an electric apparatus of a third embodiment of the present disclosure. The first engaging part 1123 of the bump and the second engaging part 22 of the annular groove in the embodiment have other shapes. In this embodiment, the cross-sectional shape of the bump is spherical, instead of the bump formed by a plurality of connected inclined surfaces as described above. Further, the annular groove is not formed by a plurality of connected concave surfaces, and a cross-section of the annular groove has a spherical shape.

Figure 8:
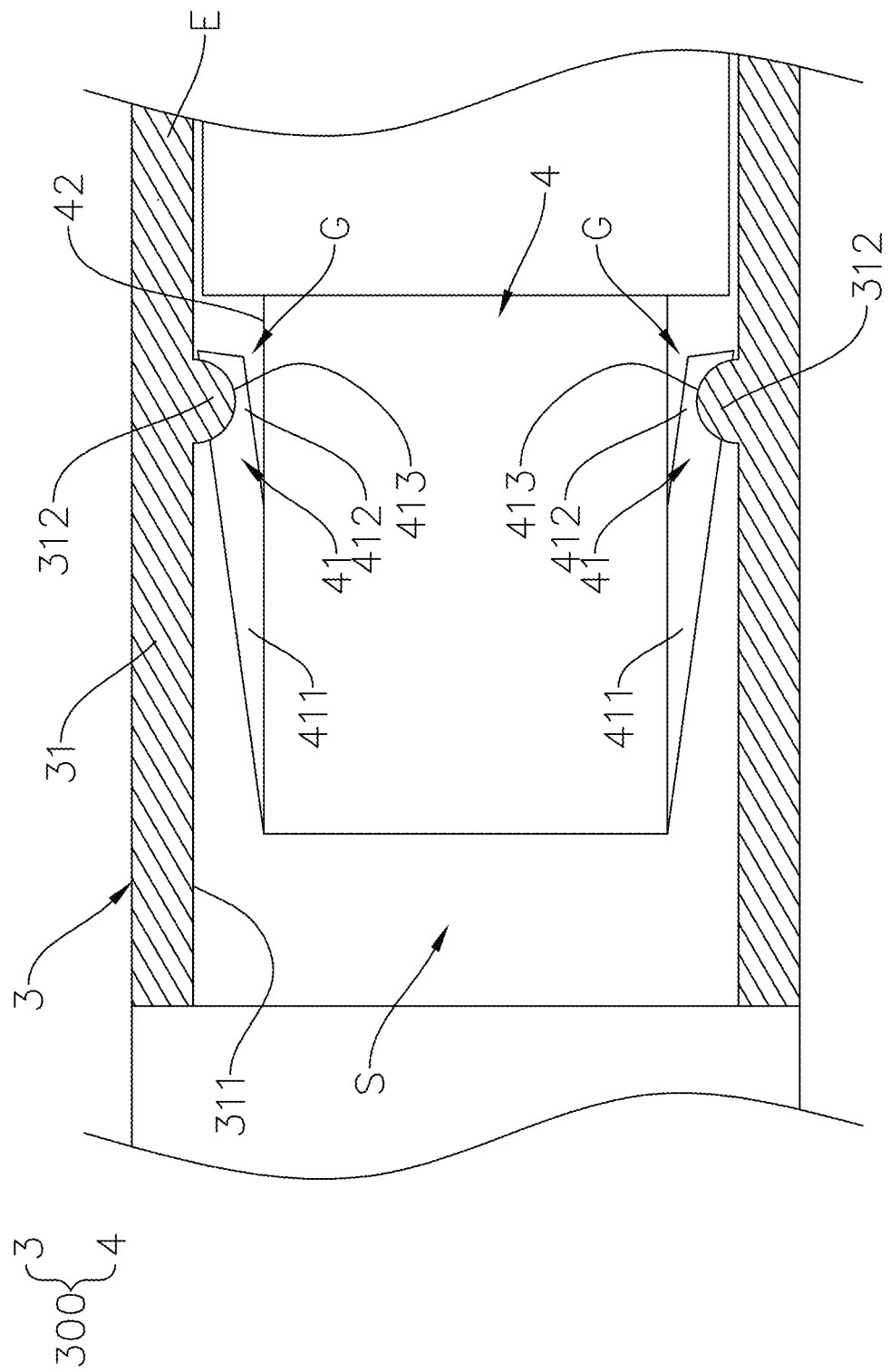
FIG. 8 is a schematic sectional diagram of a partial of an assembly structure of a fourth embodiment of the present disclosure.

Refer to FIG. 8, and FIG. 8 is a schematic sectional diagram of a partial of an assembly structure of a fourth embodiment of the present disclosure. Assembly structure 300 comprises an outer joint assembly 3 and an inner joint assembly 4. At least one terminal portion E of the outer joint assembly 3 is hollow to form an accommodating space S. The outer joint assembly 3 comprises an outer casing 31 and a first engaging part 312 disposed on the outer casing 31. The inner joint assembly 4 is provided with at least one elastic sheet 41, for example, two elastic sheets 41 arranged at a distance from each other. The elastic sheet 41 has a fixed end 411 and a free end 412. The fixed end 411 is fixed to the inner joint assembly 4, the free end 412 and the inner joint assembly 4 form a gap G therebetween, and the free end 412 is provided with a second engaging part 413. The inner joint assembly 4 is used to extend into the accommodating space S, and the first engaging part 312 and the second engaging part 413 are used to engage with each other.

Figure 9:
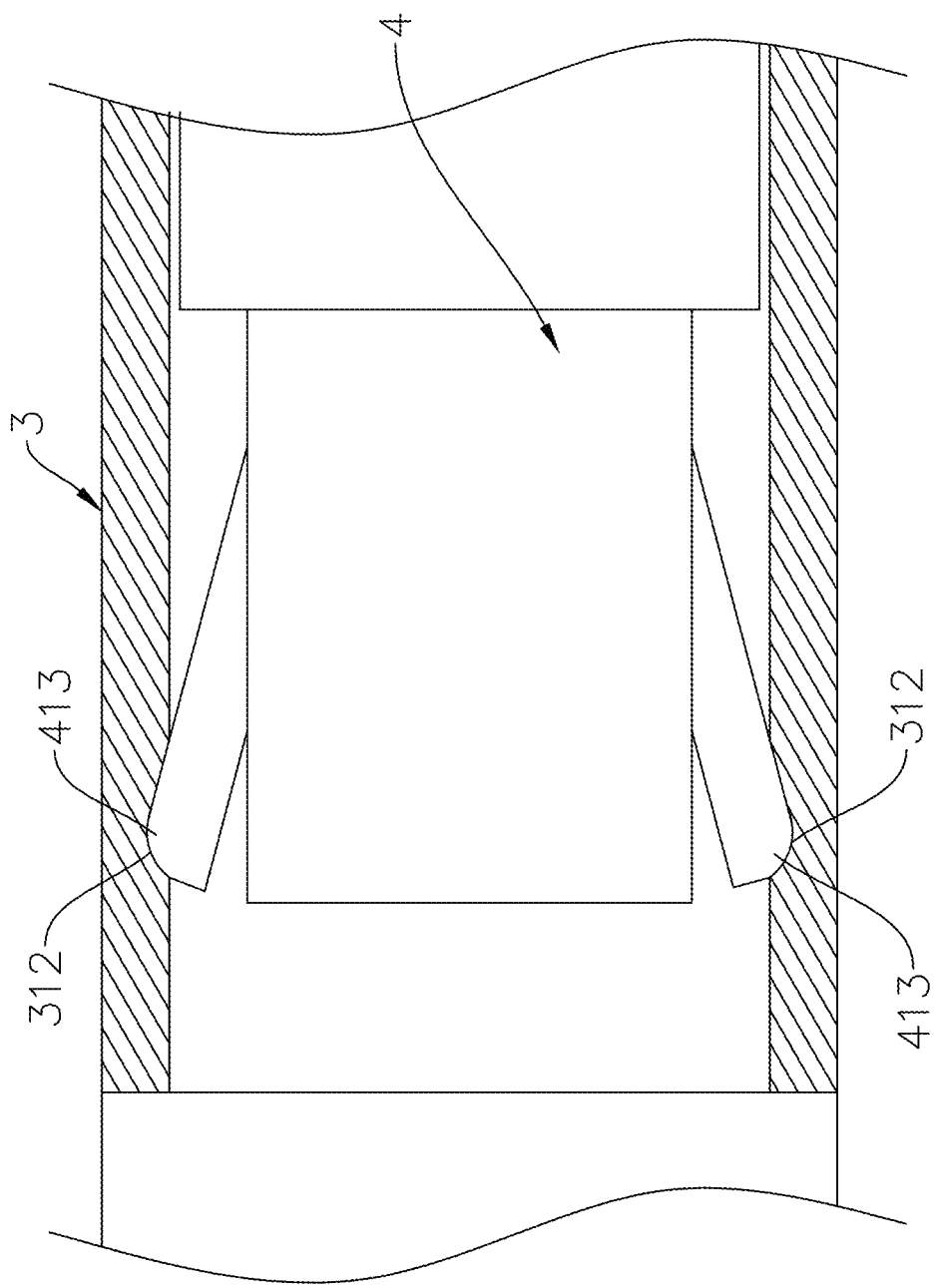
FIG. 9 is a schematic sectional diagram of a partial of an assembly structure of a fifth embodiment of the present disclosure.

Further, the gap G gradually increases from the fixed end 411 to the tail of the free end 412. The first engaging part 312 is disposed on the inner surface 311 of the outer casing 31, the elastic sheet 41 is disposed on the outer surface 42 of the inner joint assembly 4, the fixed end 411 is fixed to the outer surface 42, and the free end 412 and the outer surface 42 form the gap G. The first engaging part 312 is a 360-degree annular bump, and the second engaging part 413 is a groove. In addition, please refer to FIG. 9, and FIG. 9 is a schematic sectional diagram of a partial of an assembly structure of a fifth embodiment of the present disclosure. Unlike the embodiment of FIG. 8, the first engaging part 312 is designed to be a 360-degrees annular groove, and second engaging part 413 is designed to be a bump.

Incidentally, the assembly structure 300 may further include a circular electric socket (not shown in the drawings) and a circular electric plug (not shown in the drawings). The circular electric socket is installed in the outer joint assembly 3, the circular electric socket is connected to the power supply device via the first electrical connection wire, the circular electric plug is installed in the inner joint assembly 4, and the circular electric plug is connected to the electric device installed in the inner joint assembly 4 via the second electrical connection wire.

Furthermore, as mentioned above, the bump may have a first inclined surface and a second inclined surface connected to the first inclined surface, the slope of the second inclined surface is smaller than the slope of the first inclined surface, and the annular groove is formed by the first concave surface and the second concave surface connected to the first concave surface. The first concave surface and the first inclined surface are mutually engaged, and the second concave surface and the second concave surface are mutually engaged. Of course, in the embodiments of FIGS. 8 and 9, the bumps are bumps with curved surfaces.

Accordingly, compared with the prior art, the assembly structure of the embodiment of the present disclosure has the ability of quick connect, so it is very convenient and rapid for the user to assemble the outer joint assembly and the inner joint assembly, and it can increase the use of convenience and reduce the difficulty of assembly. Furthermore, in some embodiments, the inner joint assembly can be rotated steplessly and cyclically, so that the assembly structure of the embodiment of the present disclosure can be used in a variety of electrical apparatus applications.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An assembly structure, comprising:
   an outer joint assembly, wherein at least one terminal portion of the outer joint assembly is hollow to form an accommodating space, the outer joint assembly comprises an outer casing and at least one elastic sheet, the elastic sheet has a fixed end and a free end, the fixed end is connected to the outer casing, and the free end is provided with a first engaging part; and
   an inner joint assembly, wherein an outer surface of the inner joint assembly is provided with a second engaging part, the inner joint assembly is used to extend into the accommodating space, and the first engaging part and the second engaging part are used to engage with each other.

2. The assembly structure of claim 1, wherein the free end and the outer casing form a gap therebetween.

3. The assembly structure of claim 2, wherein the gap gradually increases from the fixed end to a tail of the free end.

4. The assembly structure of claim 3, wherein the elastic sheet is disposed on an inner surface of the outer casing, the fixed end is fixed to the inner surface, and the free end and the inner surface form the gap therebetween.

5. The assembly structure of claim 2, wherein the assembly structure further comprises a circular electric socket and a circular electric plug, wherein the circular electric socket is disposed in the accommodating space of the outer joint assembly, and the circular electric plug is disposed in the inner joint assembly, or alternatively, the circular electric plug disposed in the accommodating space of the outer joint assembly, and the circular electric socket is disposed in the inner joint assembly;
   wherein the circular electric socket and the circular electric plug are used to electrically connected to each other.

6. The assembly structure of claim 2, wherein the assembly structure further comprises:
   a circular electric socket, disposed on the side wall of the accommodating space of the outer joint assembly, wherein the circular electric socket is connected to an power supply device via a first electrical connection wire; and
   a circular electric plug, disposed on the side wall of the inner joint assembly, wherein the side wall of the inner joint assembly is connected to a part of the outer surface which is close to the second engaging part, and the circular electric plug is connected to an electric device via a second electrical connection wire.

7. The assembly structure of claim 1, wherein the at least one elastic sheet is two elastic sheets spaced apart from each other.

8. The assembly structure of claim 1, wherein the first engaging part is a bump, and the second engaging part is a groove; or alternatively, the first engaging part is a groove, and the second engaging part is a bump.

9. The assembly structure of claim 8, wherein he first engaging part is a bump, the second engaging part is a 360-degree annular groove, an outer wall of the annular groove has a notch corresponding to the bump, wherein a width of the notch is smaller than a width of the bump.

10. The assembly structure of claim 8, wherein the bump has a curved surface.

11. The assembly structure of claim 8, wherein the bump has a first inclined surface and a second inclined surface connected to the first inclined surface, a slope of the second inclined surface is smaller than a slope of the first inclined surface, the annular groove is composed of a first concave surface and a second concave surface connected to the first concave surface, the first concave surface and the first inclined surface are mutually engaged, and the second concave surface and the second concave surface are mutually engaged.

12. A assembly structure, comprising:
an outer joint assembly, wherein at least one terminal portion of the outer joint assembly is hollow to form an accommodating space, and the outer joint assembly comprises an outer casing, and the outer casing is provided with a first engaging part;
an inner joint assembly, wherein the inner joint assembly is provided with at least one elastic sheet, the elastic sheet has a fixed end and a free end, the fixed end is fixed to the inner joint assembly, the free end is provided with a second engaging part, the inner joint assembly is used to extend into the accommodating space, and the first engaging part and the second engaging part are used to engage with each other.

13. The assembly structure of claim 12, wherein the free end and the inner joint assembly form a gap therebetween.

14. The assembly structure of claim 13, wherein the gap gradually increases from the fixed end to a tail of the free end.

15. The assembly structure of claim 14, wherein the first engaging part is disposed on an inner surface of the outer casing, the elastic sheet is disposed on an outer surface of the inner joint assembly, the fixed end is fixed to the outer surface, and the free end and the outer surface form the gap.

16. The assembly structure of claim 14, wherein the assembly structure further comprises a circular electric socket and a circular electric plug, wherein the circular electric socket is disposed in the accommodating space of the outer joint assembly, and the circular electric plug is disposed in the inner joint assembly, or alternatively, the circular electric plug is disposed in the accommodating space of the outer joint assembly, and the circular electric socket is disposed in the inner joint assembly; wherein the circular electric socket and the circular electric plug are used to electrically connected to each other.

17. The assembly structure of claim 12, wherein the assembly structure further comprises:
a circular electric socket, disposed in the outer joint assembly, wherein the circular electric socket is connected to an power supply device via a first electrical connection wire; and
a circular electric plug, disposed in the inner joint assembly, wherein the circular electric plug is connected to an electric device via a second electrical connection wire.

18. The assembly structure of claim 12, wherein the at least one elastic sheet is two elastic sheets spaced apart from each other.

19. The assembly structure of claim 12, wherein the first engaging part is a bump, and the second engaging part is a groove; or alternatively, the first engaging part is a groove, and the second engaging part is a bump.

20. The assembly structure of claim 19 wherein the bump has a curved surface.

21. The assembly structure of claim 19, wherein the bump has a first inclined surface and a second inclined surface connected to the first inclined surface, a slope of the second inclined surface is smaller than a slope of the first inclined surface, the groove is an annular groove and is composed of a first concave surface and a second concave surface connected to the first concave surface, the first concave surface and the first inclined surface are mutually engaged, and the second concave surface and the second concave surface are mutually engaged.

\* \* \* \* \*